(12) United States Patent
Srivastava et al.

(10) Patent No.: US 9,710,520 B2
(45) Date of Patent: Jul. 18, 2017

(54) METHODS AND SYSTEMS FOR RANKING OF HUMAN PROFILES

(71) Applicant: Tata Consultancy Services Limited, Mumbai (IN)

(72) Inventors: Rajiv Radheyshyam Srivastava, Pune (IN); Girish Keshav Palshikar, Pune (IN); Sangameshwar Suryakant Patil, Pune (IN); Pragati Hiralal Dungarwal, Pune (IN); Abhay Sodani, Pune (IN); Sachin Pawar, Pune (IN); Savita Suhas Bhat, Pune (IN); Swapnil Vishveshwar Hingmire, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 378 days.

(21) Appl. No.: 14/452,796

(22) Filed: Aug. 6, 2014

(65) Prior Publication Data
US 2015/0112983 A1    Apr. 23, 2015

(30) Foreign Application Priority Data

Oct. 18, 2013   (IN) .......................... 3280/MUM/2013

(51) Int. Cl.
*G06F 17/30* (2006.01)
*G06Q 10/10* (2012.01)
*G06F 15/16* (2006.01)

(52) U.S. Cl.
CPC .... *G06F 17/3053* (2013.01); *G06F 17/30867* (2013.01); *G06Q 10/10* (2013.01); *G06Q 10/105* (2013.01)

(58) Field of Classification Search
None
See application file for complete search history.

(56) References Cited

U.S. PATENT DOCUMENTS 6,012,053 A * 1/2000 Pant .................. G06F 17/30696
7,827,125 B1   11/2010 Rennison
(Continued)

OTHER PUBLICATIONS

Faliagka, Evanthia, et al., "Application of Machine Learning Algorithms to an online Recruitment System", ICIW 2012 : The Seventh International Conference on Internet and Web Applications and Services, 2012, 215-220, (2012), 215-220.

*Primary Examiner* — Alex Gofman
(74) *Attorney, Agent, or Firm* — Schwegman Lundberg & Woessner, P.A.

(57) ABSTRACT

The present subject matter relates to method(s) and system(s) to rank human profiles based on selection criteria personalized to a selector. In an embodiment, the method includes obtaining querying criteria from the selector to query a database comprising a set of human profiles. Further, a subset of human profiles is determined from the set of human profiles based on the querying criteria and a default ranking mechanism. Furthermore, a selection based ranking is obtained for the subset of human profiles. Further, based on the selection based ranking, a ranking function is determined that is indicative of a relative inclination of the selector towards the one or more implicit attributes. Such a determination is by capturing at least one implicit attribute in the ranking function from the selection based ranking. Further, the ranking function is applied to rank a fresh set of human profiles based on the ranking function.

13 Claims, 2 Drawing Sheets

(56) References Cited

U.S. PATENT DOCUMENTS

| | | | |
|---|---|---|---|
| 2006/0064411 A1* | 3/2006 | Gross | G06F 17/30864 |
| 2009/0006360 A1* | 1/2009 | Liao | G06F 17/30595 |
| 2011/0055207 A1* | 3/2011 | Schorzman | G06F 17/30699 |
| | | | 707/723 |
| 2013/0054616 A1* | 2/2013 | Ammar | G06F 17/30867 |
| | | | 707/748 |

* cited by examiner

METHODS AND SYSTEMS FOR RANKING OF HUMAN PROFILES

CLAIM OF PRIORITY

This application claims the benefit of priority of Indian Patent Application Serial No. 3280/MUM/2013, filed on Oct. 18, 2013, the benefit of priority of which is claimed hereby, and which is incorporated by reference herein in its entirety.

TECHNICAL FIELD

The present subject matter relates, in general, to ranking of human profiles and, particularly but not exclusively, to ranking of human profiles based on selection criteria personalized to a selector.

BACKGROUND

There has been a rapid growth in the availability of information through the World Wide Web (web) or the internet. The web provides access to a vast amount of information related to different subjects and is stored in different formats. Certain online search engine systems allow users to search for the information, such as documents, web pages, and images, by allowing a user to input a search query relevant to his or her interest. The search engine may then identify information containing keywords present in the specified search query and rank the identified information in a particular order, to enable the user to identify information that is of relevance with lesser time and efforts.

Conventionally, such searching facility is implemented in various applications, such as online recruitment portals, matrimonial portals, and online dating portals, among other applications. Such portals capture profile information of several candidates and store the captured information in their respective databases. As mentioned above, such portals are capable of ranking profiles by taking a search query from various users as input to identify candidates suitable to their respective interests.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
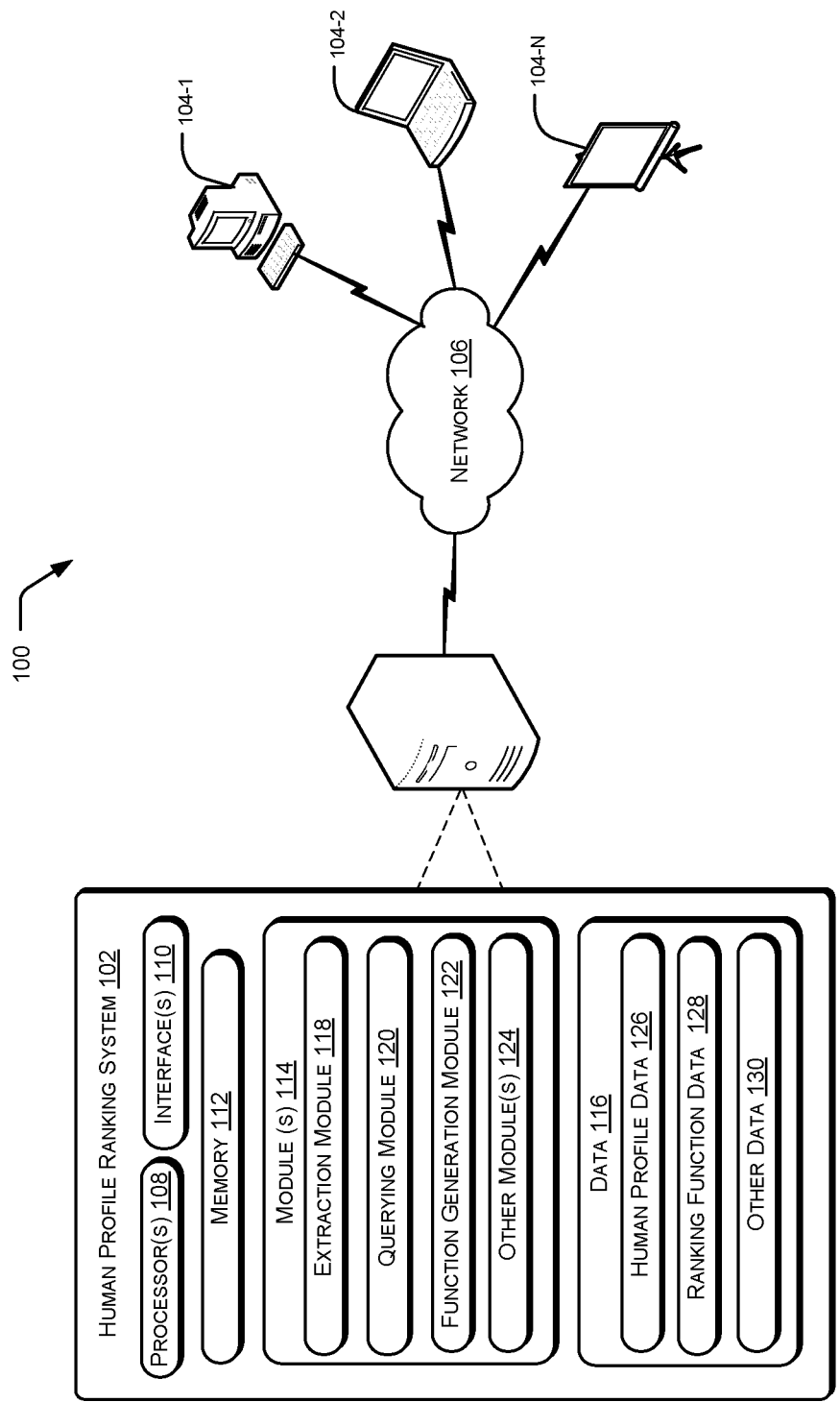
FIG. 1 illustrates a system environment implementing a human profile ranking system for ranking human profiles based on a selection criteria personalized to a selector, accordance with an implementation of the present subject matter.

Method(s) and system(s) to rank human profiles based on selection criteria personalized to a selector, are described.

Search engine systems play a relevant role in data mining for selection of a candidate, since manually identifying the candidate during the selection process consumes significant time and efforts of a selector. A search engine system serves as an automated profile information retrieval system and can be used in selecting human profiles, such as resumes, matrimonial profiles and dating profiles for various purposes, including selection for employment, dating, or for matrimonial purposes. In such conventional techniques, the profile information of candidates is captured, usually in an unstructured format, and the captured information is further stored in a human profile repository. Each such human profile repository may contain several millions of human profiles.

During a selection process, for example, for recruitment for a particular job position, selectors search several selection portals to select the right candidate. During such a selection process, the automated profile information retrieval system of each of the selection portals allows the selector to input a search query corresponding to the selector's requirement. An example of a search query for the position of a lab technician may include "Bachelors in Science with a minimum experience of 2 years". Further, the automated profile information retrieval system may search the human profile repository to rank human profiles relevant to the search query provided by the selector. The selector may, in turn, manually scan the retrieved human profiles in order to identify and rank human profiles in accordance with their relevance to the selector. With such manual intervention required in conventional methods, a significant amount of time and efforts are spent by the selectors to scan the retrieved human profiles to identify a suitable candidate.

In certain other cases, to reduce the extent of manual intervention in ranking the profiles, the conventional profile information retrieval systems can rank the human profiles in a certain predefined order based on an in-built ranking scheme, say based on relevance, incorporated in the automated profile information retrieval system. In such cases, the ranking of human profiles corresponding to a common search query may be inconsistent across the selection portals because of variations in the in-built ranking scheme deployed in different selection portals. In other words, the same search query may result in differently ranked human profiles in each selection portal.

Further, although the conventional automated profile information retrieval systems are able to automate the process of ranking the human profiles, such conventional systems do not take into consideration the selector's choice or inclination towards any attribute of the candidate while ranking the human profiles. For example, one selector may have a bias towards the experience of a candidate, whereas another selector may have a pre-disposition towards good academic record of a candidate. In another example, one selector may favor candidates with lower salaries for a job position, whereas another selector may favor to have a candidate who has worked with organizations following best business processes. The conventional ranking systems are insufficient to cater to such biases of a selector towards choice of candidates.

The present subject matter describes methods and systems for ranking of human profiles, based on a selection criteria personalized to a selector. The selection criteria can pertain to a combination of attributes, such as personal qualities, skills, knowledge and work experience, that are favored by the selector to assess and evaluate potential candidates during a selection process. Some examples of the selection criteria for an administrative position may include knowledge of Microsoft Office®, good communication skills, good organizational skills, etc. While some of the attributes for the selection criteria can be captured explicitly, according to as aspect, few other attributes can be captured implicitly or tacitly from the selector. According to the present subject matter, such implicit choice or inclination of the selector towards one or more attributes while ranking the human profiles is captured and used further.

In one example, the selector may be a Human Resource (HR) manager or a workforce management team involved in short-listing human profiles for the allocation of a job position. In said example, the human profiles include resumes. In another example, the selector may be a user involved in selecting human profiles for the purposes of matrimony or online dating. Although the description herein is provided with reference to ranking of human profiles, such as resumes, for employment purposes, the methods and systems may be implemented to rank other kinds of human profiles, such as matrimonial profiles and online dating profiles, albeit with a few variations.

The present subject matter provides for personalized ranking by determining the ranking function associated with the selector for human profiles. For this purpose, a querying criteria corresponding to one or more explicit attributes provided by the selector is used to obtain a subset of human profiles from a large collection or set of human profiles. Further, the present subject matter provides for obtaining a selection based ranking for the subset of human profiles. Such a ranking is based on selection of a human profile from a pair of human profiles, where the selection is indicative of a relative preference or bias towards the one or more implicit attributes. Further, a ranking function may be determined based on the selection based ranking, where the ranking function is indicative of a relative preference of the selector towards the one or more implicit attributes. Such implicit attributes may not be a part of the querying criteria defined by the selector and may be captured in the ranking function determined from the selection based ranking. This implies that the implicit attributes favored by the selector, can be inferred in the ranking function, based on the selection decisions while ranking the human profiles. Subsequently, the determined ranking function can be used to rank a fresh set of human profiles.

In an implementation of the present subject matter, to initiate the determination of the ranking function, the profile information corresponding to one or more attributes, such as personal qualities, skills, knowledge and work experience of an applicant's profile may be extracted to obtain a set of profiles in a structured format. The applicant's profile originally may contain information corresponding to the one or more attributes, and may be in an unstructured format, such as of different file types, different formats, etc. Such large amount of unstructured data may be difficult to manage and the selector may have to spend a substantial amount of time to manually parse through the various attributes of the applicants profile to search a right applicant for a particular position. For this purpose, various fields in the applicant profile can be checked and the information corresponding to the various fields is extracted to a predefined template and stored in the structured format. Such a set of human profiles in a standard format may obviate the need for manual processing of applicants profiles, thereby saving the selector a substantial time during the selection process.

Further, the querying criteria may be applied to query a database comprising the set of human profiles, where the querying criteria is indicative of one or more explicit attributes of a human profile, say with reference to a candidate for a job position. The querying criteria may be determined by presenting the selector with one or more queries corresponding to the explicit attributes and obtaining a response corresponding to the one or more queries. In one case, the queries can be presented to the selector in the form of a questionnaire seeking information on the one or more explicit attributes. For instance, the explicit attributes can include one or more of work experience, educational qualification, project experience, project count, role, technology, previous remuneration, skill set, professional certifications, hobbies, and location. In an example, consider that the selector is explicitly looking for certain attributes that need to be met by a candidate for a particular position, say the selector is looking for candidates having a degree in Master of Business Administration and located in Delhi for a managerial position. In such an instance, the selector may provide the querying criteria as, "Master of Business Administration AND Delhi", based on the knowledge of the explicit attributes that need to be met in a candidate, as required by the selector, for the managerial position. The querying criteria can, accordingly, include one or more such explicit attributes.

Further, a subset of human profiles is obtained from the set of human profiles based on the querying criteria. In one example, the subset of profiles that are obtained, are ranked in a certain order based on the default ranking mechanism and the querying criteria. The default ranking mechanism corresponds to ranking of the subset of human profiles based on an in built ranking scheme incorporated in the selection portal. In an example, the subset of human profiles may be ranked based on degree of relevance with regard to the querying criteria. For instance, querying criteria like, "graduate with at least 4 years work experience", for a particular job position, may select graduates having an experience of at least 4 years from the set of human profiles. The selected graduates are ranked based on a default ranking mechanism, where graduates having 6 years of work experience are preferentially ranked over graduates with 5 years of work experience.

In order to facilitate a ranking more accurately and appropriately, in one example, the two or more explicit attributes from the set of human profiles may be combined based on the querying criteria. For instance, the role and skill information from the set of human profiles may be combined to generate a ranking that is of greater relevance corresponding to the querying criteria. The subset of human profiles that are obtained, by any of the above two examples, are based on the explicit attributes that are required by the selector to shortlist human profiles, say for a particular job position.

Further, as mentioned previously, the ranking function personalized to the selector may be determined by obtaining a selection based ranking for the subset of human profiles. In one example, the selection based ranking is obtained by allowing the selector to re-rank the subset of the human profiles based on the relative inclination of the selector towards certain attributes. Such a selection based ranking is in the form of a feedback and is indicative of a relative preference or bias of the selector towards the implicit attributes while ranking the subset of human profiles. For instance, the selector may implicitly prefer candidates graduating from top tier institutions for a particular job position. Accordingly, in such an example, the selector may re-rank the subset of human profiles by assigning a higher rank to the human profiles graduating from a top tier institution as compared to the human profiles graduating from a mediocre institution.

Further, based on the selection based ranking, the implicit attributes preferred by the selector are determined. For example, if the selector has ranked the human profiles graduating from top tier of institutions higher than the human profiles graduating from other institutions, the system may identify the tier of institution to be an implicit attribute that is favored by the selector while ranking the subset of human profiles.

Further, in certain cases there may be an ambiguity in identifying the one or more implicit attributes, from the selection based ranking. For example, there may be ambiguity in identifying if the implicit attribute is tier of companies previously worked for or tier of institutions, from the selection based ranking. In such a scenario, the selector may further prompted to perform a pair-wise ranking for the subset of the profiles, where the pair-wise ranking can be used to determine selector's inclination for an attribute. In one example, in case of pair-wise ranking, the selector may be provided with one or more pairs of human profiles conflicting in the one or more attributes. For instance, if there is an ambiguity in identifying the implicit attributes, say between tier of institution and skill set, from the selection based ranking; the selector may be in turn provided with one or more pairs of human profiles, each pair of human profile conflicting in one of the tier of institution and skill set. Further, the selector can be requested to select one profile in each pair. Furthermore, the one or more implicit attributes preferred by the selector may be identified based on the selection of the human profiles from the one or more pairs of human profiles.

In another implementation, the entire selection based ranking may be performed on a pair-wise basis, say, for one or more pairs of human profiles selected from the subset of human profiles. Such a selection of a pair of human profiles from the subset of human profiles is based on pre-defined rules. For example, a pair of human profiles having similar explicit attributes may be compared for performing a selection based ranking of the human profiles. In an implementation, the selector may select a human profile from a pair of human profiles, where such a selection is indicative of the relative preference of the one or more implicit attributes from among the attributes in the pair of human profiles. Similar to the previous implementation, once the selection based ranking is obtained in the form of a feedback, the selection based ranking is analyzed to determine the implicit attributes favored by the selector in ranking the human profiles. Such a selection, based on pair-wise ranking, aids in easier decision making for the selector as the selector only has to provide a preference for one human profile over the other. Also the pair-wise ranking allows accurate determination of the implicit attributes and the accuracy is further increased with each subsequent selection of a human profile between the pair of human profiles.

Further, in an implementation, the ranking function is determined based on the selection based ranking, by employing active learning techniques. For example, the active learning techniques may be one of a Support Vector Machine (SVM) technique, boosting technique, or neural network based approach. Further, such techniques capture selection decisions from the selection based ranking by ascertaining a statistical model based on a transformation of attributes. In one example, the transformation of attributes can involve modification of the attributes from being two dimensional to a higher dimensional space, as will be understood by a person skilled in the art. Further, in one case, the statistical model is indicative of a degree of preference of at least one implicit attribute determined from the selection based ranking.

In another example, the ranking function is determined by employing regression analysis. In said example, a weight can be associated with each of the implicit attributes, the weight being indicative of relative importance given to the implicit attributes over the other attributes. For instance, greater the relevance of the implicit attribute over other attributes, greater is the weight associated with that implicit attribute.

Further, the ranking function can be evaluated for accuracy and robustness. In one example, the evaluation can be performed by utilizing a sample set of human profiles. In said example, the performance of the ranking function in ranking the sample set of human profiles is compared with an already ranked set of profiles. For instance, the closer the ranking function ranks the sample set to the already ranked set, the better is the performance. Further, in an example, the ranking function may be further tuned based on performance.

The evaluated ranking function can be further stored to implement the ranking for a fresh set of human profiles. In an example, the ranking function is implemented for ranking human profiles to select candidates similar to the candidates for whom the ranking function was determined. In other words, in such a case, the implicit and the explicit attributes preferred by the selector may substantially remain the same and therefore the evaluated ranking function can be implemented to rank a fresh set of human profiles for the same or similar candidates. However, if the implicit attributes preferred by the selector differ from that of the determined ranking function for the subsequent selection of candidates, the selector may again determine a new ranking function using a fresh set of human profiles.

The implementation of the discussed methods and systems may provide a way for ranking human profiles based on selection criteria personalized to the selector. The present subject matter allows combining of two or more attributes, from the set of human profiles, based on the querying criteria. Such a combination of the two or more attributes facilitates an accurate determination of the competency of an applicant, corresponding to a particular skill. Further, since the present subject matter takes into consideration the implicit and the explicit attributes for determining a ranking function, the subsequent ranking of the fresh set of human profiles is highly customized to the selection based ranking, thereby saving the selector of a considerable amount of time and efforts for short-listing candidates, during the selection process.

While aspects of described systems and methods can be implemented in any number of different computing systems, transmission environments, and/or configurations, the implementations are described in the context of the following system(s).

Figure 2:
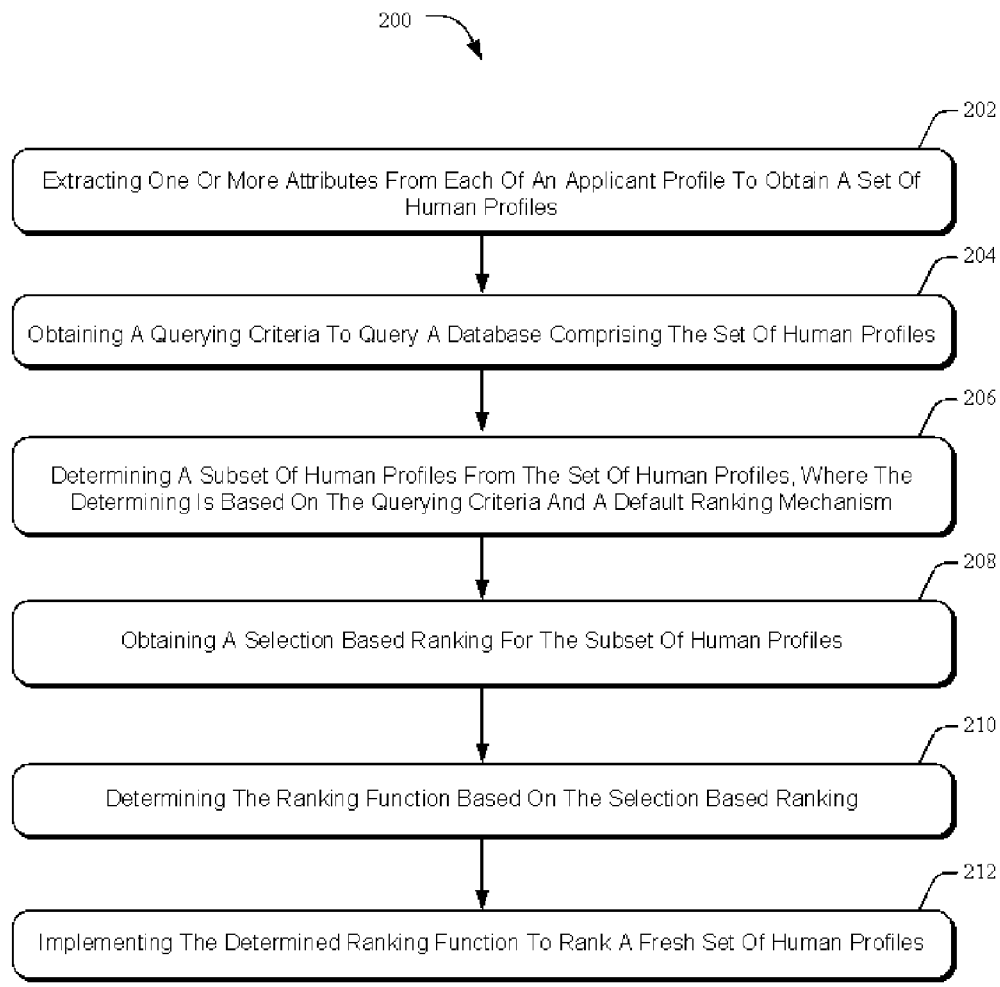
FIG. 2 illustrates a method for ranking human profiles based on the selection criteria personalized to a selector, in accordance with an implementation of the present subject matter.

The manner in which the systems and methods shall be implemented has been explained in details with respect to the FIGS. 1 and 2. Methods can be implemented in systems that include, but are not limited to, desktop computers, hand-held devices, laptops or other portable computers, and the like. Although the description herein is with reference to computing devices, the methods and systems may be implemented in other devices and systems as well, albeit with a few variations, as will be understood by a person skilled in the art.

FIG. 1 illustrates a network environment 100, implementing human profile ranking system 102, to rank human profiles, in accordance with an embodiment of the present subject matter. The human profile ranking system 102 may be simply referred to as the system 102, herein after. The system 102 described herein, can be implemented in any network environment comprising a variety of network devices, including routers, bridges, servers, computing devices, storage devices, etc. In one implementation the system 102 is connected to one or more selector devices 104-1, 104-2, 104-3 . . . 104-N, individually and commonly referred to as selector device(s) 104 hereinafter, through a network 106. The selector devices 104 may include multiple applications that may be running to perform several functions. The system 102 can be implemented as a computing device, such as a laptop computer, a desktop computer, a notebook, a workstation, a mainframe computer, a server, and the like.

The selector devices 104 may be implemented as, but are not limited to, desktop computers, hand-held devices, laptops or other portable computers, tablet computers, mobile phones, PDAs, Smartphones, and the like.

The network 106 may be a wireless or a wired network, or a combination thereof. The network 106 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 106 includes various network entities, such as gateways, routers; however, such details have been omitted for ease of understanding.

In one implementation, the system 102 includes processor(s) 108. The processor 108 may be implemented as one or more microprocessors, microcomputers, microcontrollers, digital signal processors, central processing units, state machines, logic circuitries, and/or any devices that manipulate signals, based on operational instructions. Among other capabilities, the processor(s) is provided to fetch and execute computer-readable instructions stored in the memory.

Also, the system 102 includes interface(s) 110. The interface(s) 110 may include a variety of software and hardware interfaces that allow the system 102 to interact with the entities of the network, or with each other. The interfaces 110 may facilitate multiple communications within a wide variety of networks and protocol types, including wire networks, for example, LAN, PSTN, cable, etc., and wireless networks, for example, WLAN, cellular, satellite-based network, etc.

In said embodiment of the present subject matter, the system 102 may also include a memory 112. The memory 112 may be coupled to the processor 108. The memory 112 can include any computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes.

Further, the system 102 may include module(s) 114 and data 116. The modules 114 and the data 116 may be coupled to the processors 108. The modules 114, amongst other things, include routines, programs, objects, components, data structures, etc., which perform particular tasks or implement particular abstract data types. The modules 114 may also, be implemented as, signal processor(s), state machine(s), logic circuitries, and/or any other device or component that manipulate signals based on operational instructions.

In an implementation, the module(s) 114 include an extraction module 118, a querying module 120, a function generation module 122, and other module(s) 124. The other module(s) 124 may include programs or coded instructions that supplement applications or functions performed by the system 102. In said implementation, the data 116 includes a human profile data 126, a ranking function data 128, and other data 130. The other data 130 amongst other things, may serve as a repository for storing data that is processed, received, or generated, as a result of the execution of one or more modules in the module(s). Although the data is shown internal to the system 102, it may be understood that the data 116 can reside in an external repository (not shown in the figure), which may be coupled to the system 102. The human profile ranking system 102 may communicate with the external repository through the interface(s) 110 to obtain information from the data 116.

As mentioned above, the human profiles ranking system 102 facilitates ranking of human profiles based on a selection criteria, personalized to the selector. The selection criteria can pertain to a combination of attributes, such as personal qualities, skills, knowledge and work experience, that are favored by the selector to assess and evaluate potential candidates during a selection process. For this purpose, the extraction module 118 may extract the profile information corresponding to one or more attributes of applicant profiles, to obtain a set of human profiles in structured format. The one or more attributes may include one or more of work experience, educational qualification, project experience, project count, role, technology, previous remuneration, skill set, professional certifications, hobbies, and location.

However, the profile information corresponding to each such one or more attributes may be in an unstructured format, such as of different file types, different formats, etc. For example, it may be possible that the applicant profiles are of different file types, such as a .doc file, .txt file, HTML file, etc. In another example, the applicant profiles may be of different formats. For instance, one applicant might have the work experience dated in a US style format, reading as month/date/year and another applicant might have the work experience dated in the format of date/month/year. For this purpose, in one implementation, the extraction module 118 may identify various fields from the applicant's profiles that are of relevance to the selector, and further, extract the information corresponding to the various fields to a predefined template to obtain a set of human profiles in a structured format.

For example, during a recruitment process, the extraction module 118 may extract information corresponding to work experience, educational qualification, awards, and projects done, of a resume to a predefined template. The predefined template may be associated with keywords corresponding to various fields of the resume. For instance, the keywords may be based on the one or more attributes, such as previous work experience, educational qualification, and skill set. Such an extraction to a predefined template is to obtain a set of human profiles in a structured format. The set of human profiles thus obtained, may be stored in the human profile data 126.

Further, a querying criteria indicative of one or more explicit attributes, provided by the selector, of a human profile, is applied to query the human profile data 126 comprising the set of human profiles. For this purpose, in an implementation, the querying module 120 may determine the querying criteria by providing the selector with one or more queries associated with the one or more explicit attributes of the human profile. Further, the querying module 120 may receive inputs on the one or more queries from the selector, to determine the querying criteria. The one or more queries request information of one or more of a work experience, educational qualification, project experience, project count, role, technology, previous remuneration, skill set, professional certifications, hobbies, and location. For example, the querying module 120, may request the selector to provide preference on education qualification, domain, and work experience. The querying module 120 may determine the querying criteria, based on the response provided by the selector. Some illustrative examples of the querying criteria for a recruitment process include, "Master of Science or M.S in Chemistry with 0-2 years of experience", "Master of Business Administration or M.B.A in Finance with 10 years of experience", etc.

In another example, the querying module 120 may provide one or more queries to the selector, where the one or more queries may correspond to age, hobbies, remuneration, religion, nationality, orientation, complexion, interests, etc., for the purposes of matrimony or online dating. For this purpose, the querying module 120 may determine the querying criteria based on the response obtained on the one or more queries. Certain other examples of the querying criteria for matrimonial or dating purposes include, "a 26 year old, handsome, male, located in Bangalore", "tall, Indian, female, interested in music", etc.

In another implementation, the querying criteria may be defined by the selector, based on the choice of human profiles by the selector for a particular position. For example, if the selector is aware of the explicit attributes, such as location and educational qualification, that need to be present in a candidate profile for matrimonial purposes, the selector may define the querying criteria based on combining the geographic and educational qualification details suiting to the requirements of the selector.

In one implementation, the querying module 120 may further select the subset of human profiles from the set of human profiles by applying the querying criteria. Such a selection is based on the relevance of each human profile, from the set of human profiles, with regard to the querying criteria. For example, let us consider a set of human profiles with varied professional qualifications, such as Master of Science, Bachelor of Science, Bachelor of Arts, and also with varied professional experience ranging from 0-10 years. Upon applying the querying criteria like, "Master of Science with 2 years experience", the querying module 120, may select the subset of human profiles relevant to the querying criteria.

In another example, let us consider a matrimonial portal comprising of set of human profiles. The human profile data 126 of the matrimonial portals database may contain the set of human profiles of varying in nationality, sexes, professional qualifications, religion, hobbies, interests and age. Upon applying the querying criteria like, "26 to 27 year old male Indian interested in cricket", the querying module 120, may select the subset of human profiles that are relevant to the querying criteria.

The querying module 120 may rank each profile in the subset of human profiles based on the querying criteria and a default ranking mechanism. In an example, the profiles in the subset of human profiles may be ranked based on degree of relevance with regard to the querying criteria. Such a ranking may be based on assigning a score, where the scoring is based on relevance of each of the subset of human profile with regard to the querying criteria. For instance, consider two human profiles with similar attributes, such as educational qualification, work experience, percentage of marks, professional certifications, skill set, domain knowledge, but with difference in the tier of institutions. Let us assume that one of the applicant's is a pass out from an Ivy league institution and the other applicant is a pass out from a mediocre institution. In such a scenario, even if both the human profiles are short-listed for the given querying criteria, the two human profiles may be ranked differently, and the difference in ranking may be based on the weight of attribute, i.e., the tier of institution, implemented in the default ranking mechanism.

In another implementation, the querying module 120 may combine two or more explicit attributes from the set of profiles, based on the querying criteria. In an example, the combination of the two or more explicit attributes, from the human profiles may be performed based on the querying criteria. Such a combination is to determine the competency of an applicant corresponding to a particular skill or to derive attributes. For example, let us consider that human profiles familiar with "Java technology" are being short-listed for a particular job position. In order to determine the competency of an applicant, the extraction module 118 may combine the skill information, along with the experience information, to determine the competency of the applicant with "Java technology." In other words, greater the experience of the applicant in Java technology, greater the competency of the applicant. Accordingly, the work experience of the candidate in Java is indicative of the competency of the applicant with "Java technology".

Further, a ranking function personalized to the selector is determined based on selection based ranking, done by the selector, for the subset of profiles. For this purpose, the function generation module 122 may determine the ranking function by obtaining the selection based ranking from the selector. The selection based ranking can involve re-ranking the subset of the human profiles by the selector based on the relative inclination of the selector towards certain attributes. Such a selection based ranking is in the form of a feedback and is indicative of a relative preference or bias of the selector towards the implicit attributes while ranking the subset of human profiles. Some examples of the implicit attributes that the selector may consider while ranking the subset of human profiles include determining the applicants history of accepting responsibility in a job position, determining if the applicant has the industry experience in the specific domain, determining if the applicant has an experience of working at a company of similar size and resource, etc.

Further, the function generation module 122 may determine the ranking function based on the selection based ranking, where the ranking function is indicative of a relative preference of the selector towards the one or more implicit attributes. Such implicit attributes may not be a part of the querying criteria defined by the selector and may be captured in the ranking function determined from the selection based ranking. However, in certain cases the function generation module 122 may be indecisive in identifying the one or more implicit attributes based on the selection based ranking. In such a scenario, the function generation module 122 may provide the selector with one or more pair of human profiles conflicting in one attribute. Further, the function generation module 122 may obtain a selection from the selector, where the selection is based on performing the pair-wise ranking between the one or more human profiles.

Such a selection is indicative of the implicit attributes preferred by the selector over the other attributes in the pair-wise ranking.

For example, in a scenario where the system 102 is indecisive in identifying if the implicit attribute is tier of companies or tier of institutions, the function generation module 122 may provide the selector with one or more pair of human profiles conflicting either in tier of companies or tier of institutions. Further, the selector may perform a pair-wise ranking, where the ranking is indicative of the selector's preference of one attribute, over the other, thereby enabling the function generation module 122 to identify a suitable candidate for a particular job position.

In one implementation, the entire selection based ranking may be based on a performing a pair-wise ranking of two or more pair of human profiles, selected from the subset of human profiles. Such a selection of a pair of human profiles from the subset of human profiles is based on pre-defined rules. For example, a pair of human profiles having similar explicit attributes may be compared for performing a selection based ranking of the human profiles. The pair-wise ranking may be performed based on ranking a human profile between a pair of human profiles. Such a ranking may be based on attributes, implicit to the selector. For example, the selector may preferentially select human profiles graduating from a top tier institution as opposed to the human profiles graduating from a mediocre institution while performing a pair-wise ranking, for a particular job position.

In both the implementations as discussed above, the selector implicitly ranks the subset of human profiles based on certain biases towards one or more attributes, i.e., the implicit attributes. Such implicit attributes may vary from selector to selector or may depend on the nature of the job position. For instance, an HR manager may give more importance to the average percentage received in college and the candidates from top-tier colleges, but a seasoned project manager may recruit candidates who have not done frequent job changes. In another instance, a selector may give more importance to age and location while choosing a suitor for matrimonial or dating purposes, whereas another selector may give more preference to the professional qualification and hobbies.

Further, a ranking function may be determined by the function generation module 122 where the ranking function is substantially indicative of a ranking methodology followed by the selector in ranking the human profiles. In an example, the ranking function may be determined by employing active learning techniques. For instance, the active learning techniques may be one of a Support Vector Machine (SVM) technique, boosting technique, or neural network based approach. Further, such techniques capture selection decisions from the selection based ranking by ascertaining a statistical model based on a transformation of attributes from say, two dimensional to a higher dimensional space, as understood by a person skilled in the art. The statistical model may be indicative of degree of inclination of at least one implicit attribute captured from the selection based ranking.

In one implementation, the function generation module 122 may assign a weight, based on the relevance of the discriminative attribute with the other attributes. In one implementation, the ranking function is determined based on assigning a weight for the one or more implicit attributes, where the weight is indicative of relative importance given to the implicit attributes with respect to the other attributes. Some examples of the ranking function include:

$$f1 = 0.4(\text{CS Grad}) + 0.8(\text{Experience}) - 0.7(\text{Number of Job Changes}) \quad (1)$$

$$f2 = (0.4(\text{Experience}^2 + \text{Average Marks}))/(\text{Number of Job Changes} + 1) \quad (2)$$

where, $f1$ and $f2$ are indicative of the ranking function, CS Grad, Experience, Number of Job Changes and Average Marks are the determined discriminative attributes, and the weights 0.4, 0.8 used in the equations (1) and (2) are indicative of the relative importance given to a particular attribute with respect to the other attributes.

The function generation module 122 may further evaluate the ranking function based on utilizing a sample set of human profiles. In one implementation, the ranking function is evaluated for accuracy and robustness. In one example, the evaluation can be performed based on utilizing the sample set of human profiles. In said example, the performance of the ranking function in ranking the sample set of human profiles is compared with an already ranked set of the sample set. For instance, greater the confidence interval of the ranking function in ranking the sample set to the already ranked set, the better is the performance. The confidence interval is measure of reliability of the determined ranking function. Further, in an example, the ranking function may be further tuned based on the confidence interval.

The evaluated ranking function can be further stored to implement the ranking for a fresh set of human profiles. In an example, the ranking function is implemented for ranking human profiles to select candidates similar to the candidates for whom the ranking function was determined. In other words, in such a case, the implicit and the explicit attributes preferred by the selector may substantially remain the same and therefore the evaluated ranking function can be implemented to rank a fresh set of human profiles for the same or similar candidates. However, if the implicit attributes preferred by the selector differ from that of the determined ranking function for the subsequent selection of candidates, the selector may again determine a new ranking function using a fresh set of human profiles.

FIG. 2 illustrates a method 200 to rank human profiles based on a selection criteria personalized to a selector, according to an implementation of the present subject matter. In an example, the selector can be a Human Resource (HR) manager, an individual, or a workforce management team involved in short-listing human profiles for a job position. In another example, the selector may be a selector involved in short-listing human profiles for matrimonial or dating purposes. The order in which the method 200 is described is not intended to be construed as a limitation, and any number of the described method blocks can be combined in any order to implement the method 200, or any alternative methods. Additionally, individual blocks may be deleted from the method 200 without departing from the spirit and scope of the subject matter described herein. Furthermore, the method 200 can be implemented in any suitable hardware platform(s).

The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network. In a distributed computing environment, computer executable instructions may be located in both local and remote computer storage media, including memory storage devices.

Further, although the method 200 may be implemented in any computing device; in an example described in FIG. 2, the method 200 is explained in context of the aforementioned device 202, for the ease of explanation.

Accordingly, referring to FIG. 2, at block 202, the profile information corresponding to one or more attributes of an applicant's profile may be extracted to a predefined template to obtain a set of human profiles in a structured format. The one or more attributes can include work experience, educational qualification, project experience, project count, role, technology, previous remuneration, skill set, professional certifications, hobbies, and location. In an example, the predefined template may comprise of keywords corresponding to the one or more attributes of an applicant's profile. In one implementation, the extraction module 118 of the system 102 may extract the one or more attributes.

At block 204, querying criteria, personalized to a selector, may be obtained to query a database comprising the set of human profiles. In an example, the querying criteria can be determined by providing the selector with one or more queries corresponding to one or more attributes and further obtaining a response on the one or more queries. In another example, the querying criteria may be defined based on the selector's choice of human profiles for a particular position. An example of the querying criteria can be, "Java professionals with 0-2 years of experience". In one implementation, the querying module 120 of the system 102, may determine the querying criteria.

At block 206, a subset of human profiles is determined from the set of human profiles, based on the querying criteria and a default ranking mechanism. In one implementation, the subset of human profiles is selected based on querying a database comprising the set of human profiles with the querying criteria. The subset of human profiles are ranked based on the default ranking mechanism. In an example, the subset of human profiles may be ranked based on degree of relevance with regard to the querying criteria.

At block 208, a selection based ranking for the subset of human profiles may be obtained to determine the ranking function. Such a selection based ranking is in the form of a feedback and is indicative of a relative preference or bias of the selector towards one or more implicit attributes while ranking the subset of human profiles. In one example, the selection based ranking may include re-ranking the subset of human profiles based on the relative preference of the one or more implicit attributes. In another example, the selection based ranking may be based on performing a pair-wise ranking for one or more pairs of human profiles. Such a pair-wise ranking is based on selection of a human profile from a pair of human profiles that are selected from the subset of human profiles. In said example, the selection is indicative of the relative preference of the one or more implicit attributes. In an implementation, the function generation module 122 of the human profile ranking system 102 may determine the ranking function.

At block 210, ranking function is determined based on the selection based ranking done by the selector for the subset of the human profiles. In an implementation, the ranking function may be determined by employing active learning techniques that capture selection decisions from the selection based ranking by ascertaining a statistical model. In an example, the statistical model can be ascertained based on transformation of attributes from a lower dimension, say two dimension, to a higher dimensional space, as will be understood by a person skilled in the art. In an implementation, the statistical model may be indicative of degree of inclination of at least one implicit attribute from the selection based ranking. In another example, at least one implicit attribute is associated with a weight, where the weight is indicative of relative importance given to the implicit attributes over the other attributes.

At block 212, the determined ranking function can be further implemented to rank a fresh set of human profiles. In an example, the ranking function is implemented for ranking human profiles to select candidates similar to the candidates for whom the ranking function was determined. In other words, in such a case, the implicit and the explicit attributes preferred by the selector may substantially remain the same and therefore the evaluated ranking function can be implemented to rank a fresh set of human profiles for the same or similar candidates.

Although implementations for methods and systems for ranking human profiles, personalized to the selector, are described, it is to be understood that the present subject matter is not necessarily limited to the specific features or methods described. Rather, the specific features and methods are disclosed as implementations for ranking of human profiles, based on selection criteria personalized to the selector.

We claim:

1. A computer implemented method to rank human profiles personalized to a selector, the method comprising:

obtaining querying criteria, by a processor, to query a database comprising a set of human profiles, wherein each profile in the set of human profiles is associated with a plurality of attributes, wherein obtaining the querying criteria comprises determining the querying criteria, wherein determining the querying criteria comprises:

providing, by the processor, at least one query, to the selector, wherein the at least one query corresponds to information associated with at least one explicit attribute from among the plurality of attributes, and wherein the plurality of attributes comprise work experience, educational qualification, project experience, project count, role, technology, previous remuneration, skill set, professional certifications, hobbies, and location; and obtaining, by the processor, a response on the at least one query from the selector, to determine the querying criteria;

determining, by the processor, a subset of human profiles from the set of human profiles based on the querying criteria and on a degree of relevance with respect to the querying criteria;

obtaining, by the processor, a selection based ranking for the subset of human profiles, wherein the selection based ranking is a pair-wise ranking comprising selection of a human profile from a pair of human profiles, and wherein the pair of human profiles are selected from the subset of human profiles based on pre-defined rules;

determining, by the processor, a ranking function based on the selection based ranking, wherein the ranking function is indicative of relevance to the selector towards at least one attribute from among the plurality of attributes;

evaluating the ranking function by applying the ranking function on a sample set of human profiles, wherein the ranking function of the sample set of human profiles is compared with a prior ranked set of profiles, and wherein the accuracy of evaluation is based on a ratio of ranking function ranks of the sample set to the prior ranked set; and applying, by the processor, the evaluated ranking function to rank a fresh set of human profiles personalized to the selector.

2. The method as claimed in claim 1, wherein the set of human profiles are obtained, by the processor, based on extracting the plurality of attributes to a predefined template, from each applicant's profile.

3. The method as claimed in 1 wherein the subset of human profiles may be determined, by the processor, based on combining at least two attributes from among the plurality of attributes based on the querying criteria.

4. The method as claimed in claim 1, wherein the selection based ranking, by the processor, is indicative of at least one implicit attribute preferred by the selector while selecting the human profile from the pair of human profiles.

5. The method as claimed in claim 1, wherein the ranking function is determined by the processor, based on employing active learning techniques, and wherein the active learning techniques capture at least one implicit attribute based on the selection based ranking, and wherein the active learning techniques comprising at least one of a Support Vector Machine (SVM) technique, boosting technique, and neural network based approach.

6. The method as claimed in claim 1, wherein each of the at least one attribute is an implicit attribute selected by the selector and wherein each of the implicit attribute in the ranking function is associated with a weight, and wherein the weight is indicative of relevance of the attribute to the querying criteria.

7. The method as claimed in claim 1 further comprising evaluating, by the processor, the ranking function based on utilizing a sample set of human profiles.

8. A human profile ranking system to rank of human profiles based on selection criteria personalized to a selector, the human profile ranking system comprising:
   a processor;
   a querying module coupled to the processor, to determine a subset of human profiles from a set of human profiles based on querying criteria and on a degree of relevance with respect to the querying criteria, wherein each human profile from among the set of human profiles is associated with a plurality of attributes, wherein the querying criteria is determined by:
      providing at least one query, to the selector, wherein the at least one query corresponds to information associated with at least one explicit attribute from among the plurality of attributes; and
      obtaining a response on the at least one query from the selector, to determine the querying criteria; and
   a function generation module coupled to the processor, to:
      obtain selection based ranking for a subset of human profiles, wherein the selection based ranking is a pair-wise ranking comprising selection of a human profile from a pair of human profiles, and wherein the pair of human profiles are selected from the subset of human profiles based on pre-defined rules;
      determine a ranking function based on the selection based ranking, and wherein the ranking function is indicative of an inclination of the selector towards the at least one attribute from among the plurality of attributes;
      evaluate the ranking function by applying the ranking function on a sample set of human profiles, wherein the ranking function of the sample set of human profiles is compared with a prior ranked set of profiles, and wherein the accuracy of evaluation is based on a ratio of ranking function ranks of the sample set to the prior ranked set; and
      apply the evaluated ranking function to rank a fresh set of human profiles personalized to the selector.

9. The human profile ranking system as claimed in claim 8 further comprises an extraction module coupled to the processor, to:
   extract a plurality of attributes from each applicant's profile to a predefined template to obtain the set of human profiles; and
   combine at least two attributes from among the plurality of attributes, based on a querying criteria.

10. The human profile ranking system as claimed in claim 8, wherein the function generation module further evaluates the ranking function to apply the ranking function to rank a fresh set of human profiles.

11. The human profile ranking system as claimed in claim 8, wherein the function generation module determines the ranking function based on active learning techniques, and wherein the active learning techniques capture at least one implicit attribute based on the selection decisions from the selection based ranking by ascertaining a statistical model based on a transformation of attributes to a higher dimensional space, and wherein the statistical model is indicative of degree of inclination towards the at least one implicit attribute from the selection based ranking.

12. The human profile ranking system as claimed in claim 8, wherein the at least one attribute is an implicit attribute selected by the selector and wherein the function generation module associates a weight for each of the at least one implicit attribute in the ranking function, and wherein the weight is indicative of relevance of the attribute to the querying criteria.

13. A non-transitory computer readable medium having a set of computer readable instructions that, when executed, cause a computing system to:
   obtain querying criteria to query a database comprising a set of human profiles, wherein each profile in the set of human profiles is associated with a plurality of attributes, wherein the querying criteria is obtained by determining the querying criteria, wherein determining the querying criteria comprises:
      providing at least one query, to the selector, wherein the at least one query corresponds to information associated with at least one explicit attribute from among the plurality of attributes, and wherein the plurality of attributes comprise work experience, educational qualification, project experience, project count, role, technology, previous remuneration, skill set, professional certifications, hobbies, and location; and
      obtaining a response on the at least one query from the selector, to determine the querying criteria;
   determine a subset of human profiles from the set of human profiles based on the querying criteria and on a degree of relevance with respect to the querying criteria;
   obtain selection based ranking for the subset of human profiles, wherein the selection based ranking is a pair-wise ranking comprising selection of a human profile from a pair of human profiles, and wherein the pair of human profiles are selected from the subset of human profiles based on pre-defined rules;
   determine a ranking function based on the selection based ranking, wherein the ranking function is indicative of the selector towards at least one attribute from among the plurality of attributes;

evaluate the ranking function by applying the ranking function on a sample set of human profiles, wherein the ranking function of the sample set of human profiles is compared with a prior ranked set of profiles, and wherein the accuracy of evaluation is based on a ratio of ranking function ranks of the sample set to the prior ranked set; and apply the evaluated ranking function to rank a fresh set of human profiles personalized to the selector.

* * * * *